United States Patent [19]

Teramachi

[11] Patent Number: 5,375,931
[45] Date of Patent: Dec. 27, 1994

[54] LINEAR MOTION BEARING

[75] Inventor: Hiroshi Teramachi, Tokyo, Japan

[73] Assignee: THK Co., Ltd., Tokyo, Japan

[21] Appl. No.: 918,522

[22] Filed: Jul. 23, 1992

[30] Foreign Application Priority Data

Aug. 21, 1991 [JP] Japan .................... 3-234068

[51] Int. Cl.$^5$ .............................................. F16C 31/06
[52] U.S. Cl. .................................................... 384/45
[58] Field of Search ........................... 384/45, 43, 44; 464/168

[56] References Cited

U.S. PATENT DOCUMENTS

| | | |
|---|---|---|
| 4,040,679 | 8/1977 | Teramachi . |
| 4,296,974 | 10/1981 | Teramachi . |
| 4,348,064 | 9/1982 | Teramachi . |
| 4,376,557 | 3/1983 | Teramachi . |
| 4,496,196 | 1/1985 | Teramachi . |
| 4,555,149 | 11/1985 | Teramachi . |
| 5,059,037 | 10/1991 | Albert ................... 384/45 |
| 5,108,197 | 4/1992 | Morita . |

FOREIGN PATENT DOCUMENTS 2049838A 12/1980 United Kingdom .

*Primary Examiner*—Lenard A. Footland
*Attorney, Agent, or Firm*—Armstrong, Westerman, Hattori, McLeland & Naughton

[57] ABSTRACT

The invention relates to a linear motion bearing, which has an extremely high rigidity against a moment load and a stable performance, and is formed of a track rail and a slider disposed over the track rail with a large number of balls therebetween. The slider has a channel-like form having a horizontal portion and a pair of skirts extending from opposite sides of the horizontal portion. Each skirt is provided at its inner side with one ball rolling surface faced upward, and the horizontal portion is provided at the vicinity of the middle of its inner side with at least two ball rolling surfaces faced downward.

4 Claims, 4 Drawing Sheets

LINEAR MOTION BEARING

FIELD OF THE INVENTION AND RELATED ART STATEMENT

The present invention relates to a linear motion bearing of a four-directional uniform load type, which is used in a slide surface, e.g., of a machining center and a table saddle of a machine tool, and is also used at a location for reciprocatively carrying a heavy object in a transfer apparatus.

There has been a linear motion bearing shown in FIGS. 6 and 7, which has a high rigidity against a moment load and can achieve a stable performance. Specifically, the bearing is formed of a track rail 60 which has a large width and is fixed to a reference surface R by fixing bolts in multiple rows for bearing a moment load, a slider 50 disposed over the track rail 60, and a large number of balls 70 which are disposed between the slider 50 and track rail 60 for sliding the slider 50 along the track rail 60.

The track rail 60 is provided at each side surface with two ball rolling surfaces 61 extending in an axial direction and is also provided with mounting apertures 62 in multiple rows through which the fixing bolts are inserted.

The slider 50 is formed of a bearing body 51 and a pair of end caps 52 fixed to opposite end surfaces of the body 51. The bearing body 51 has a horizontal portion 51a and a pair of skirts 51b extending from opposite sides of the horizontal portion 51a, and thus has a channel-like form. Each skirt 51b is provided at its inner surface with two ball rolling surfaces 51d opposed to the ball rolling surfaces 61 of the track rail 60, and is also provided with ball escape apertures 51e axially penetrating the solid portion thereof. The horizontal portion 51a of the bearing body 51 is provided at each of side and middle portions with two mounting apertures 51f for mounting and fixing a table T by six bolts.

Further, the end cap is provided with ball return grooves for connecting the ball rolling surfaces 51d of the bearing body 51 to the ball escape apertures 51e. Endless paths for the balls are formed by fixing the end caps to the bearing body.

Holders 80, which prevent drop of the balls 70 when the slider 50 is removed from the track rail 60, are attached to a cavity 51c formed at inner side of the bearing body 51 and ends of each skirt 51b.

Since the linear motion bearing thus foraged has a large rigidity against the moment load, it can be used as a single axis structure in a slide part, in which bearings in two or more axes have been required due to a large moment load in the prior art, and thus a space for the slide part can be reduced, as compared with the prior art.

In the conventional linear motion bearing described above, however, a distance W between the balls 70 located at opposite sides of the track rail 60 is large, as shown in FIG. 6, so that a middle of the horizontal portion 51a of the bearing body 51 is liable to deflect downward.

In the linear motion bearing, therefore, the thickness of the horizontal portion 51a of the bearing body 51 is increased for increasing the rigidity, but this unpreferably increases a distance from the reference surface R to a mounting surface of the table T, i.e., a height of the bearing.

In order to form the ball rolling surfaces 51d in two rows on each skirt 51b of the bearing body 51, a space between the two ball rolling surfaces 51d must be larger than a diameter of the ball, and further, a certain distance is required between the horizontal portion 51a and each ball rolling surface 51d adjacent thereto in view of machining by a grinder. For this reason, the height of the linear motion bearing thus formed cannot be reduced.

As the height of the bearing increases, the rigidity against the moment load inevitably decreases, and thus the rigidity against the moment load cannot be sufficiently increased in the linear motion bearing in the prior art described above.

Further, in the linear motion bearing thus formed, the bolts for fixing the table T are devised to engage with the horizontal portion 51a of the bearing body 51 so as to prevent the downward deflection of the horizontal portion 51a. However, the pulling force by the bolts cannot be increased to a large extent, so that the effect by this structure cannot be sufficiently expected.

OBJECT AND SUMMARY OF THE INVENTION

The present invention has been developed for overcoming the problems of the prior art, and has an object to provide a linear motion bearing having an extremely large rigidity against the moment load and capable of maintaining a stable performance.

In order to achieve the above object, the present invention provides a linear motion bearing comprising a slider of a channel-like form having a horizontal portion and a pair of skirts extending from opposite sides of the horizontal portion, one ball rolling surface faced upward being formed at an inner side of each skirt, and at least two ball rolling surfaces faced downward being formed at the vicinity of a middle of an inner surface of the horizontal portion; a track rail over which the slider is disposed, the track rail being provided at its opposite side surfaces with ball rolling surfaces faced downward toward the upward ball rolling surfaces of the slider and being provided at its upper surface with ball rolling surfaces faced upward toward the downward ball rolling surfaces of the slider; and a large number of balls which move along endless paths in the slider and are located between the upward rolling surfaces of the slider and the downward rolling surfaces of the track rail and between the downward rolling surfaces of the slider and the upward rolling surfaces of the track rail to bear a load.

According to the invention, the horizontal portion of the slider is carried upwardly by the ball in rows which roll on the two or more ball rolling surfaces faced downward and formed at the vicinity of the middle of the inner side thereof, so that the middle of the horizontal portion is not deflected downward by a load. In the linear motion bearing to which the present invention is applied, therefore, it is possible to positively increase widths of the slider and track rail, and thus a load performance and a rigidity against a moment load of the bearing can be remarkably improved.

Since the middle of the horizontal portion of the slider does not deflect downward, the thickness of the horizontal portion of the slider can be reduced, as compared with the linear motion bearing in the prior art, and thus the whole height of the bearing can be reduced. Further, only one ball rolling surface faced upward is formed on the skirt of the slider, and the downward ball rolling surfaces are formed at the vicinity of the middle of the horizontal portion of the slider. Therefore, the length of the skirt can be reduced without causing interference between the balls rolling on the upward and downward ball rolling surfaces, which also enables the reduction of the height of the bearing.

As stated above, since the height of the linear motion bearing of the invention can be remarkably reduced, the rigidity against the moment load can be remarkably increased.

Since the middle of the horizontal portion of the slider does not deflect downward when the load is applied thereto, the skirts of the slider do not diverge outward, and thus the large rigidity can be maintained against the load in any direction.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENT

A linear motion bearing according to the invention will be described in detail with reference to the drawings.

Figure 1:
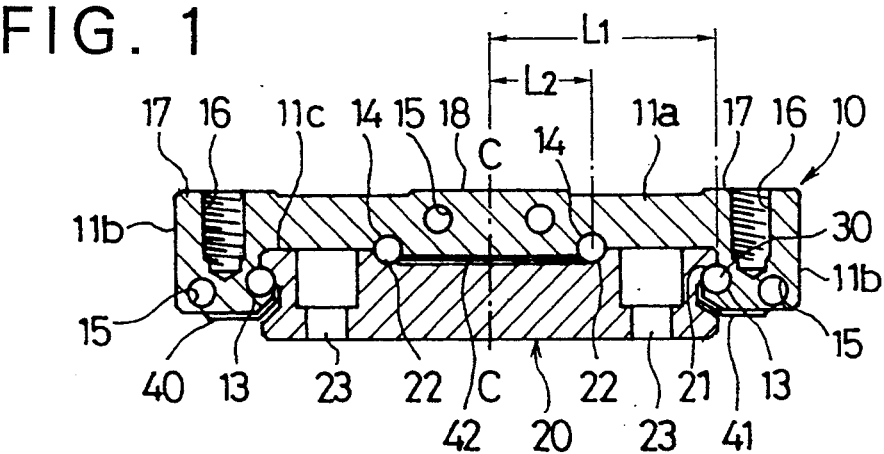
FIG. 1 is a cross section showing a first embodiment of a linear motion bearing according to the invention.
Figure 2:
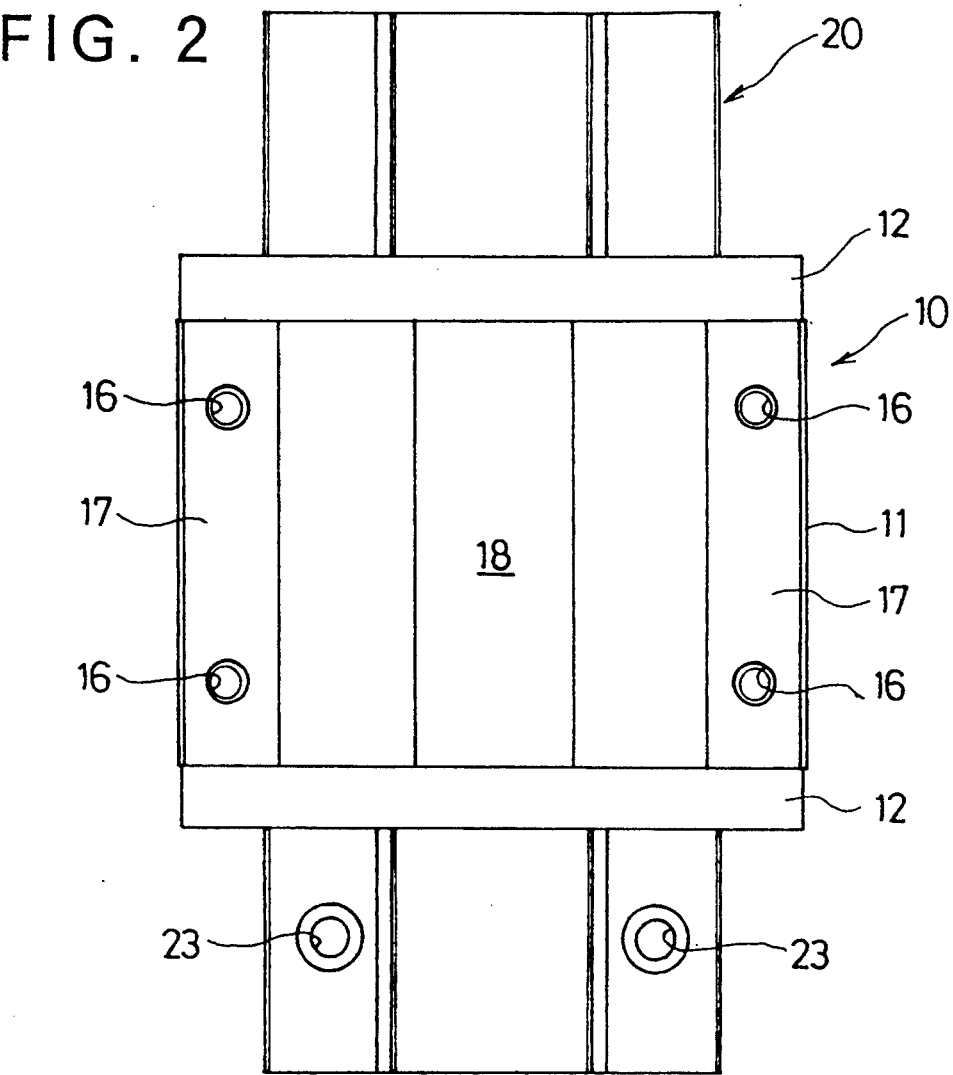
FIG. 2 is a plan of a linear motion bearing according to a first embodiment.

FIGS. 1 and 2 show a linear motion bearing according to a first embodiment of the invention. The linear motion bearing according to this embodiment is formed of a track rail 20 fixed to a reference surface by unillustrated fixing bolts in multiple rows, a slider 10 disposed over the track rail, and a large number of balls 30 which are disposed between the slider 10 and the track rail 20 and serve to slide the slider 10 in an axial direction (perpendicular to a sheet of FIG. 1) of the track rail 20.

The track rail 20 has a nearly oblong section having a width larger than its height. The track rail is provided at its each side surface with one ball rolling surface 21 which extends axially and is faced downward, and is also provided at the vicinity of the middle of its upper surface with two ball rolling surfaces 22 which extend axially and are faced upward. These downward and upward ball rolling surfaces 21 and 22 are laterally symmetrical to each other with respect to a section C-C containing an axis of the track rail 20. In this first embodiment, a distance $L_1$ between the ball rolling surface 21 and the section C-C is substantially twice as long as a distance $L_2$ between the upward ball rolling surface 22 and the section C-C. Each of the ball rolling surfaces 21 and 22 forms a single-arch groove having a radius of curvature substantially equal to a radius of curvature of the ball 30. Reference numbers 23 indicate mounting apertures through which the fixing bolts are inserted.

The slider 10 is formed of a bearing block 11 made from metal and a pair of end caps 12 which are made from plastics and fixed to opposite end surfaces of the block 11. The bearing block 11 has a channel-like form including a horizontal portion 11a and a pair of skirts 11b extending downward from opposite side edges of the portion 11a, and also has a channel groove 11c which is located above the track rail 20 and is complementary in shape to the rail 20. Each skirt 11b is provided at its inner side with an upward ball rolling surface 13 faced to the downward ball rolling surface 21 on the track rail 20. The horizontal portion 11a is provided at the vicinity of the middle of its inner side with two ball rolling surfaces 14 faced downward toward the upward ball rolling surfaces 22 of the track rail 20. These ball rolling surfaces 13 and 14 form single-arch grooves, similarly to the ball rolling surfaces 21 and 22 of the track rail 20.

The respective ball rolling surfaces 13 and 14 are laterally symmetrical to each other with respect to the section C-C containing the axis of the bearing block 11. In this embodiment, a distance $L_1$ between the upward ball rolling surface 13 of the skirt 11b and the section C-C is nearly twice as large as a distance $L_2$ between the downward ball rolling surface 14 of the horizontal portion 11a and the section C-C. This relationship of $L_1 = 2L_2$ is determined to minimize the downward deflection of the horizontal portion 11a when a downward load is applied to the bearing block 11, based on a mechanical calculation assuming the horizontal portion as a double-end supported lever.

In this embodiment, only one ball rolling surface 13 faced upward is formed on the skirt 11b of the bearing block 11, and the downward ball rolling surfaces 14 are formed near the middle of the horizontal portion 11a. Therefore, even if the length of the skirt 11b is short, the balls 30 rolling on the upward ball rolling surface 13 do not interfere with the balls 30 rolling on the downward ball rolling surface 14. Accordingly the heights of the bearing block 11 and thus the slider 10 can be reduced.

Further, the balls 30 are pinched between the downward ball rolling surface 21 of the track rail 20 and the upward ball rolling surface 13 of the bearing block 11, or between the upward ball rolling surface 22 of the track rail 20 and the downward ball rolling surface 14 of the bearing block 11, and roll on these rolling surfaces while bearing the load.

In this operation, a contact direction of the ball 30 to the upward ball rolling surface 13 of the skirt 11b, i.e., a direction of ball contact line forms about 45 degrees to the horizontal direction. Also, a direction of ball contact line on the downward ball rolling surface 14 of the horizontal portion 11a forms about 45 degrees to the horizontal direction. Therefore, the linear motion bearing in this embodiment can bear the load uniformly in the vertical and lateral directions. Provided that the direction of the ball contact line on each of the ball rolling surfaces 13 and 14 to the horizontal direction is in a range of 45±10 degrees, the linear motion bearing can bear the load substantially uniformly in the four directions.

Ball escape apertures 15 which correspond to the ball rolling surfaces 13 and 14 axially penetrate solid portions of the skirts 11b and horizontal portion 11a. Opposite ends of each ball escape aperture 15 are connected to the ends of the corresponding ball rolling surfaces through ball return grooves (not shown), so that the balls 30 may endlessly circulate the ball rolling surfaces and ball escape apertures 15.

Ball retainers 40, 41 and 42 made of steel plates ate attached to ends of the inner surfaces of the skirts 11b and the lower surface of the horizontal portion 11a of the bearing block 11, so that drop of the balls 30 may be prevented when the slider 10 is removed from the track rail 20. These retainers 40, 41 and 42 are fixed to the bearing block 11, e.g., by screws.

The horizontal portion 11a of the bearing block 11 is provided at opposite side portions and middle portion with mounting surfaces 17 and 18 for mounting a table. The mounting surface 17 at each side is provided with two mounting holes 16. Therefore, the slider 10 is fixed to the table by four bolts. In the invention, it is not necessary to form a mounting hole at the middle of the mounting surface 18 of the horizontal portion 11a. The horizontal portion 11a is carried from the lower side by the balls 30, which roll between the upward ball rolling surfaces 22 of the track rail 20 and the downward ball rolling surfaces 14 of the horizontal portion 11a. This results in a structure capable of preventing or suppressing the deflection of the middle portion of the horizontal portion 11a. In the illustrated embodiment, since the balls 30 upwardly carry the horizontal portion 11a, the horizontal portion 11a may have a small thickness without causing the deflection thereof.

Figure 3:
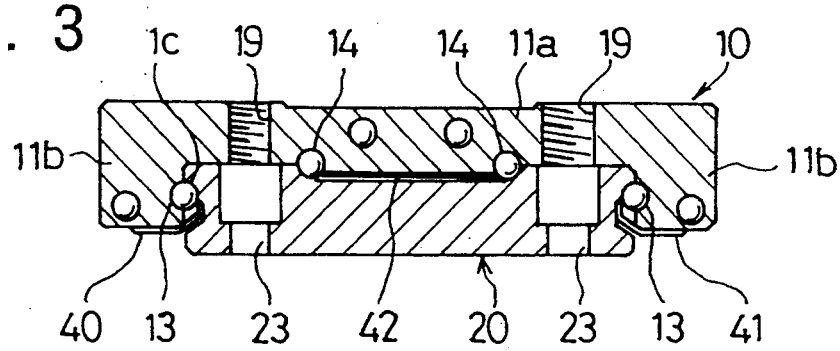
FIG. 3 is a cross section showing a second embodiment of a linear motion bearing according to the invention.
Figure 4:
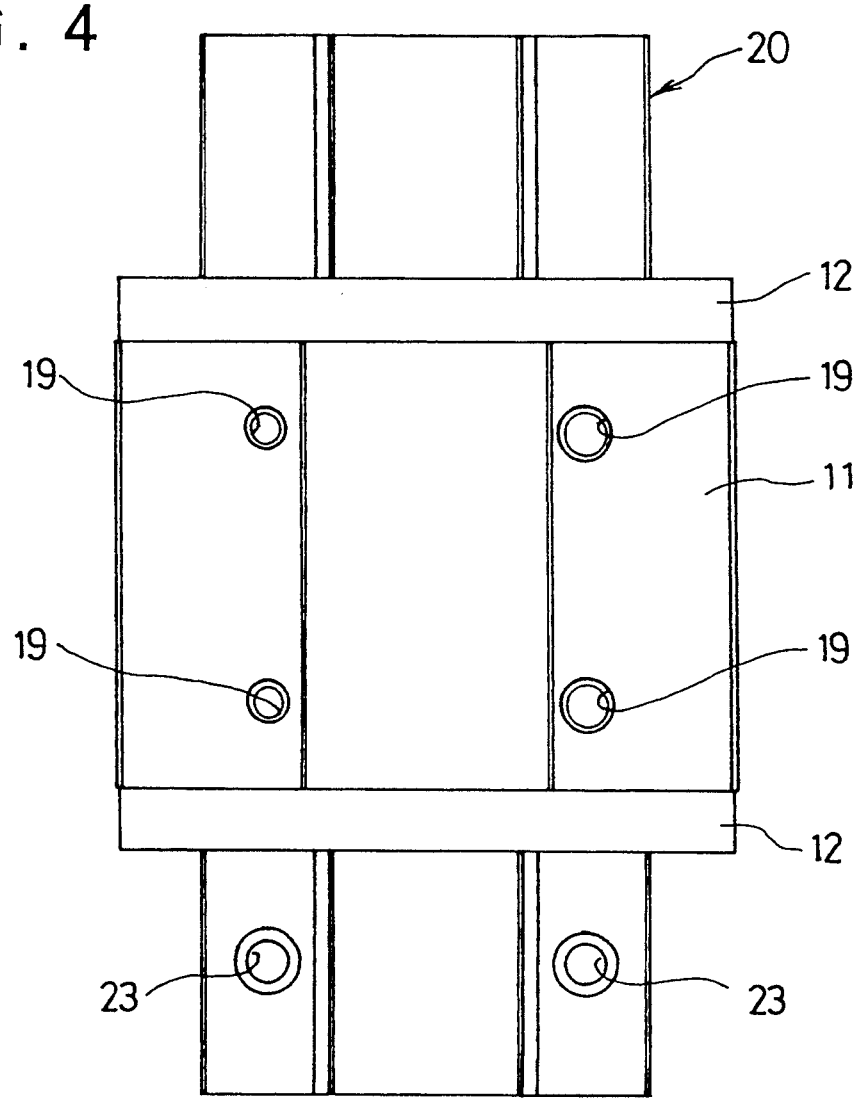
FIG. 4 is a plan of a linear motion bearing according to a second embodiment.

FIGS. 3 and 4 show a second embodiment of the invention. In the linear motion bearing according to this embodiment, mounting holes 19 for mounting the table are formed at positions near the middle of the horizontal portion 11a of the bearing block 11. The other structures are similar to those of the first embodiment, and thus will not be described below.

In cases that loads are applied in various directions to the linear motion bearing according to the invention, reaction forces in various directions and deformation of the bearing block 11 are caused as described below.

Figure 5A:
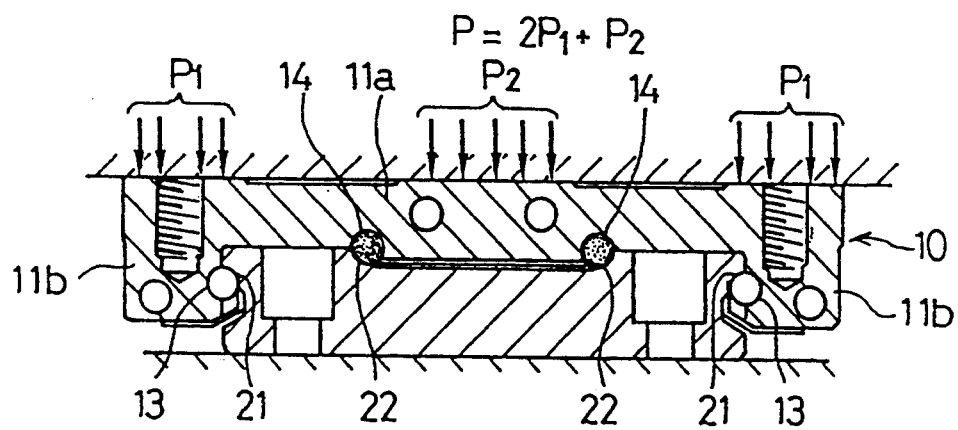
FIG. 5 is a view showing distribution of a reaction force and deformation of a slider when loads are applied in various directions to a linear motion bearing according to a second embodiment.

(a) In a case the slider 10 receives the downward load (1) When the table T applies the downward load P to the slider 10, the load P disperses in the mounting surfaces 17 and 18 of the bearing block 11, as shown in FIG. 5(a), and uniform distribution loads $P_1$ and $P_2$ act on the mounting surfaces 17 and 18, respectively, where $P = 2P_1 + P_2$.

(2) The balls which bear these loads are balls (indicated by solid black circles in the figure) which roll on the downward ball rolling surfaces 14 of the bearing block 11. Since these balls are located at the vicinity of the middle of the horizontal portion 11a bear the load, the horizontal portion 11a are not deflected downward by the load $P_2$ acting on the mounting surface 18, and both the skirts 11b do not diverge outward. Therefore, the linear motion bearing according to the invention maintains a sufficient rigidity against the downward load.

Figure 5B:
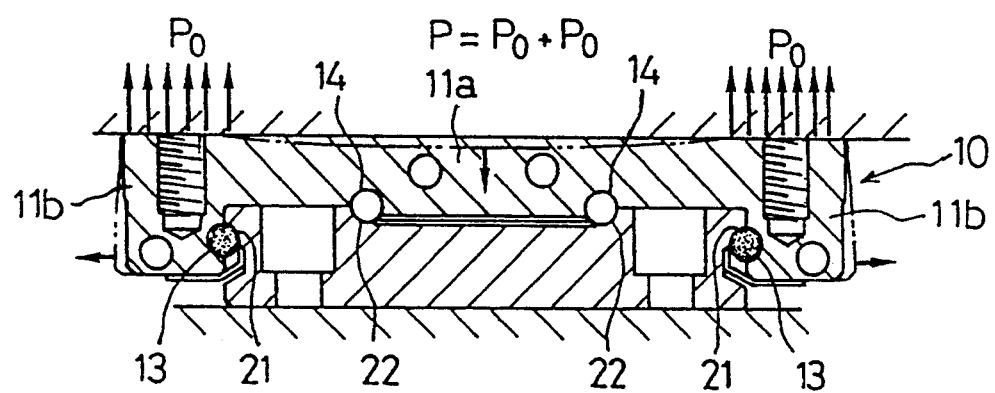

(b) In a case the slider 10 receives the upward load (1) When the table T applies the upward load P against the slider 10, this load P acts on the bearing block 11 as a load $P_0$ transmitted through the bolts, as shown in FIG. 5(b), where $P = P_0 + P_0$.

(2) The balls which bear the loads are balls (indicated by black solid circles in the figure) which roll on the ball rolling surfaces 13 of the bearing block 11. When these balls bear the load, the skirts 11b tend to diverge downward, and simultaneously the middle portion of horizontal portion 11a tends to deflect downward. However, since the horizontal portion 11a is carried upward by the balls rolling on the downward ball rolling surfaces 14, the horizontal portion 11a does not deflect downward. As a result, the displacement of the skirts 11b can be suppressed. Thus, the linear motion bearing of the invention maintains the sufficient rigidity against the upward load.

Figure 5C:
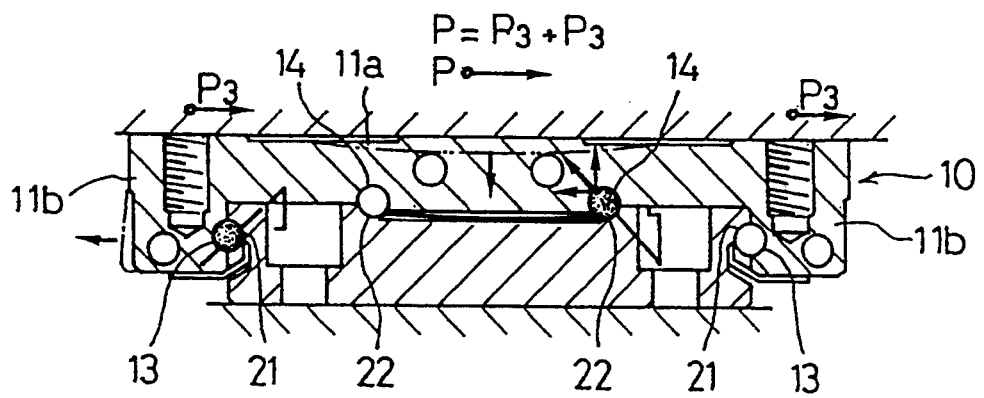
Figure 6:
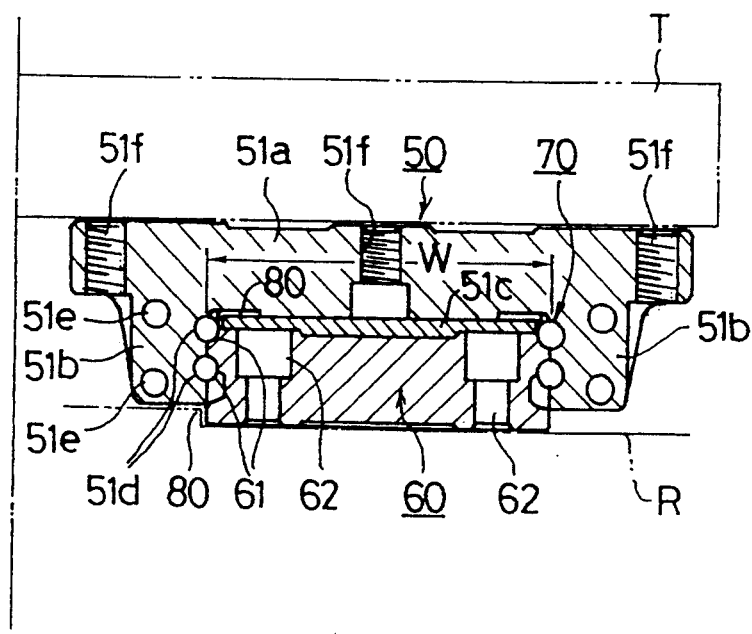
FIG. 6 is a cross section showing a linear motion bearing in the prior art.
Figure 7:
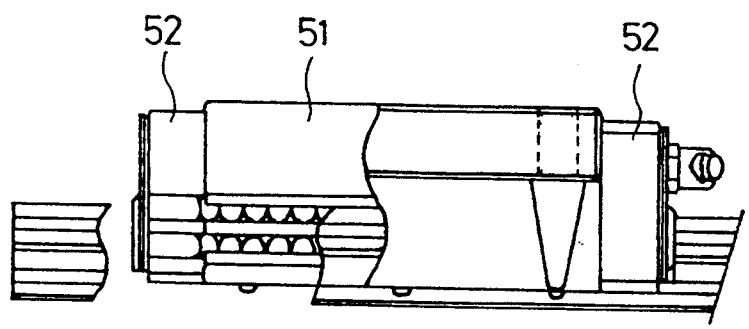
FIG. 7 is a plan showing a linear motion bearing in the prior art.

(c) In a case the slider 10 receives the lateral load (1) When the table T applies the lateral load P to the slider 10, this load P is divided into the loads $P_3$ acting on the mounting surfaces 17 of the bearing block 11, as shown in FIG. 5(c), where $P = P_3 + P_3$.

(2) The balls which bear the loads are balls (indicated by black solid circles) which roll on the upward ball rolling surface 13 formed on the left skirt 11b and the downward ball rolling surface 14 located at the right side in the horizontal portion 11a.

(3) First, description will be made on the former balls. When these balls bear the load, the left skirt 11b tends to deflect outward as indicated by an arrow, and simultaneously, the middle portion of the horizontal portion 11a tends to deflect downward similarly to the above case (b). However, since the horizontal portion 11a is carried upwardly by the balls rolling on the downward ball rolling surfaces 14, the horizontal portion 11a does not deflect downward. As a result, the displacement of this skirt 11b can be suppressed.

(4) Then, description will be made on the right balls. When these balls receive the lateral load, the reaction force thereof acts to push the middle portion of the horizontal portion 11a upwardly. However, the middle portion of the horizontal portion 11a is in contact with the table T through the mounting surface 18 of the bearing block 11, and thus cannot be deflected upwardly by the load. Therefore, the displacement of the right skirt 11b can be suppressed.

Thus, the linear motion bearing of the present invention maintains a sufficient rigidity against the lateral load.

The directions of the ball contact lines in the upward ball rolling surfaces 13 and downward ball rolling surfaces 14 formed in the bearing block 11 are not restricted to those in the embodiments described above, and may be arbitrarily determined in accordance with the directions of the loads to be born by the bearing. For example, the direction of the ball contact line in the downward ball rolling surface 14 may be at 90 degrees to the horizontal direction, and the direction of the ball contact line in the upward ball rolling surface 13 may be at 30 degrees to the horizontal direction.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A linear motion bearing, comprising:
   a slider of a channel-like form having a horizontal portion and a pair of skirts extending from opposite sides of said horizontal portion, one ball rolling surface faced upward being formed at an inner side of each skirt, and at least two ball rolling surfaces faced downward being formed at a middle portion of an inner surface of said horizontal portion;

a track rail over which said slider is disposed, said track rail being provided at opposite side surfaces thereof with ball rolling surfaces faced downward toward said upward ball rolling surfaces of said slider and being provided at its upper surface with ball rolling surfaces faced upward toward said downward ball rolling surfaces of said slider; and a plurality of balls which move along endless paths in said slider and are located between said upward rolling surfaces of said slider and said downward rolling surfaces of said track rail and between said downward rolling surfaces of said slider and said upward rolling surfaces of said track rail to bear a load, wherein a horizontal distance between said upward ball rolling surface of said slider and an axis of said bearing is twice as large as a horizontal distance between said downward ball rolling surface of said slider and said axis of said bearing.

2. A linear motion bearing as claimed in claim 1, wherein directions of ball contact lines in said upward ball rolling surfaces and downward ball rolling surfaces of said slider form angles of 45±10 degrees with respect to the horizontal direction.

3. A linear motion bearing, comprising:

a slider of a channel-like form having a horizontal portion and a pair of skirts extending from opposite sides of said horizontal portion, one ball rolling surface faced upward being formed at an inner side of each skirt, and at least two ball rolling surfaces faced downward being formed at a middle portion of an inner surface of said horizontal portion;

a track rail over which said slider is disposed, said track rail being provided at opposite side surfaces thereof with ball rolling surfaces faced downward toward said upward ball rolling surfaces of said slider and being provided at its upper surface with ball rolling surfaces faced upward toward said downward ball rolling surfaces of said slider; and a plurality of balls which move along endless paths in said slider and are located between said upward rolling surfaces of said slider and said downward rolling surfaces of said track rail and between said downward rolling surfaces of said slider and said upward rolling surfaces of said track rail to bear a load, wherein a distance in a height direction between said upward ball rolling surface and said downward ball rolling surface of said slider is substantially equal to or less than a diameter of said ball.

4. A linear motion bearing as claimed in claim 3, wherein directions of ball contact lines in said upward ball rolling surfaces and downward ball rolling surfaces of said slider form angles of 45±10 degrees with respect to the horizontal direction.

* * * * *